United States Patent
Ariga et al.

(10) Patent No.: US 9,362,588 B2
(45) Date of Patent: Jun. 7, 2016

(54) LITHIUM-ION SECONDARY BATTERY AND MANUFACTURING METHOD FOR SAME

(75) Inventors: Toshiyuki Ariga, Hitachinaka (JP); Satoshi Watanabe, Hitachinaka (JP); Yoshikazu Noiri, Hitachinaka (JP)

(73) Assignee: HITACHI AUTOMOTIVE SYSTEMS, LTD., Ibaraki (JP)

(*) Notice: Subject to any disclaimer, the term of this patent is extended or adjusted under 35 U.S.C. 154(b) by 185 days.

(21) Appl. No.: 14/238,900

(22) PCT Filed: Aug. 25, 2011

(86) PCT No.: PCT/JP2011/069196
§ 371 (c)(1),
(2), (4) Date: Feb. 14, 2014

(87) PCT Pub. No.: WO2013/027296
PCT Pub. Date: Feb. 28, 2013

(65) Prior Publication Data
US 2014/0212717 A1 Jul. 31, 2014

(51) Int. Cl.
*H01M 10/0587* (2010.01)
*H01M 10/04* (2006.01)
*H01M 2/14* (2006.01)
*H01M 10/052* (2010.01)

(52) U.S. Cl.
CPC ............ *H01M 10/0431* (2013.01); *H01M 2/14* (2013.01); *H01M 10/052* (2013.01); *H01M 10/0587* (2013.01); *Y02E 60/122* (2013.01); *Y02P 70/54* (2015.11); *Y10T 29/49108* (2015.01)

(58) Field of Classification Search
CPC ......................... H01M 10/0525; H01M 10/052
See application file for complete search history.

(56) References Cited

U.S. PATENT DOCUMENTS

| | | | | |
|---|---|---|---|---|
| 4,565,753 A | * | 1/1986 | Goebel | H01M 6/14 429/94 |
| 2001/0051296 A1 | * | 12/2001 | Morishita | H01M 2/263 429/94 |
| 2005/0287431 A1 | * | 12/2005 | Cho | H01M 2/06 429/161 |
| 2008/0292946 A1 | * | 11/2008 | Lee | H01M 10/0431 429/94 |
| 2010/0035132 A1 | * | 2/2010 | Park | H01M 2/361 429/94 |
| 2010/0203373 A1 | | 8/2010 | Kawase et al. | |
| 2011/0052976 A1 | | 3/2011 | Ishii et al. | |
| 2014/0030562 A1 | | 1/2014 | Ishii et al. | |

FOREIGN PATENT DOCUMENTS

| | | | |
|---|---|---|---|
| EP | 0854529 A1 | * | 7/1998 |
| JP | 08-064199 A | | 3/1996 |
| JP | 11-121041 A | | 4/1999 |
| JP | 2006-278245 A | | 10/2006 |

(Continued)

*Primary Examiner* — Stewart Fraser
*Assistant Examiner* — Olatunji Godo
(74) *Attorney, Agent, or Firm* — Volpe and Koenig, P.C.

(57) ABSTRACT

An object of this present invention is to provide: a lithium-ion secondary battery 1 constructed to easily interpose an electrical insulating protection film 41 between a battery container 2 and an electricity-generating element 3, to facilitate automatic mounting of the insulating protection film 41, and thus to be highly producible; and a method of manufacturing the battery. The lithium-ion secondary battery 1 of the invention is characterized in that the battery is electrically insulated between the battery container 2 and the electricity-generating element 3, and in that the insulating protection film 41 of a sheet-like form is wrapped around the electricity-generating element 3.

6 Claims, 9 Drawing Sheets

(56) References Cited

FOREIGN PATENT DOCUMENTS

| | | |
|---|---|---|
| JP | 2008-171583 A | 7/2008 |
| JP | 2009-026704 A | 2/2009 |
| JP | 2009-170137 A | 7/2009 |
| JP | 2010-287456 A | 12/2010 |
| JP | 2011-049066 A | 3/2011 |
| JP | 2011-150961 A | 8/2011 |
| JP | 2011-159621 A | 8/2011 |
| JP | 2012-079466 A | 4/2012 |

* cited by examiner (a)

(b)

LITHIUM-ION SECONDARY BATTERY AND MANUFACTURING METHOD FOR SAME

TECHNICAL FIELD

The present invention relates to lithium-ion secondary batteries used for motor vehicles, for example.

BACKGROUND ART

Rectangular batteries are traditionally known as the batteries in which is obtained a higher volumetric density than that of a cylindrical battery. Rectangular batteries include a flat, wound electrode structure accommodated as an electricity-generating element in a rectangular battery container. The flat, wound electrode structure is constructed by winding a band-like positive electrode plate including a non-coated positive electrode section (exposed positive electrode foil section) formed at an end portion, and a negative electrode plate including a non-coated negative electrode section (exposed negative electrode foil section) formed at an end portion. More specifically, the positive electrode plate and negative electrode plate in the wound electrode structure are wound together under a separator-insulated state to form a stack of layers so that the non-coated positive electrode section and the non-coated negative electrode section are arranged at positions opposite to each other. Even more specifically, one of the non-coated electrode sections is positioned at one side of the wound electrode structure, in an axial direction of winding, and the other non-coated electrode section is positioned at the other side of the wound electrode structure, in the axial direction of winding.

The wound electrode structure includes a positive electrode connection terminal joined to a stacked section of a positive electrode current collector that has the non-coated positive electrode section folded in layers, and a negative electrode connection terminal joined to a stacked section of a negative electrode current collector that has the non-coated negative electrode section folded in layers. The positive electrode connection terminal and the negative electrode connection terminal are connected to, for example, a positive electrode outside terminal and a negative electrode outside terminal, respectively, these outside terminals being arranged on the same surface of the battery container, such as a surface of a battery cover, on the outside of the battery container. Thus, electrical continuity is established between the positive or negative electrode connection terminal and the corresponding outside terminal. That is to say, the positive electrode connection terminal and the negative electrode connection terminal are constructed to electrically neutralize the battery container, that is, to electrically insulate the battery container from the wound electrode structure.

For the rectangular batteries of this type, a variety of measures are proposed to protect inner walls of the battery container as well as the wound electrode structure positioned inside the battery. The protection is provided by interposing an electrical insulating sheet or film between the wound electrode structure and the inner walls of the battery container. This insulating sheet or film prevents the outer-peripheral positive electrode section and negative electrode section of the wound electrode structure from short-circuiting through the inner walls of the battery container, and protects the surface of the wound electrode structure from damage when the electrode structure is inserted into the battery container.

For example, a known sheet of insulating material, as disclosed in Patent Document 1, includes one pair of wide-surface forming sections that forms one pair of wide surfaces opposed to a flat surface of a wound electrode structure, a base-forming section present between the paired wide-surface forming sections, the base-forming section forming a base opposed to that of a battery casing, and two pairs of narrow-sideface forming sections each present at one side of the paired wide-surface forming sections, the two pairs of narrow-sideface forming sections forming narrow sidefaces at both sides of a wide surface of the battery casing; wherein the narrow-sideface forming sections arranged in bag-like folded form inside the sheet are formed to be smaller than the narrow-sideface forming sections arranged outside the sheet, and thus the wound electrode structure can be easily inserted into an outer casing of the battery.

PRIOR ART DOCUMENTS

Patent Documents

Patent Document 1: JP-2010-287456-A

SUMMARY OF THE INVENTION

Problem to be Solved by the Invention

The secondary battery shown in Patent Document 1, however, is of the construction with the insulating sheet formed into a complexly folded box-like shape, the wound electrode structure accommodated in this box-like section, and this section encased in the outer casing. Forming such a box-like insulating sheet as this existing one, requires the steps of (1) folding the sheet, (2) accommodating the wound electrode structure in the sheet, and (3) inserting the sheet into the outer casing with care so as not to allow the sheet to shift in position. The folding of the sheet, in particular, is difficult to automate, which leads to a lack of productivity.

The present invention has been made considering the above problems associated with the prior art, and an object of the invention is to provide: a lithium-ion secondary battery that, allows an electrical insulating member to be easily interposed between a container of the battery and an electricity-generating element, facilitates automatic mounting of the insulating member, and has thus highly productive construction; and a method of manufacturing the battery.

Means for Solving the Problem

The lithium-ion secondary battery of the present invention that solves the foregoing problems provides electrical insulation between the battery container and the electricity-generating element accommodated in the battery container, and an insulating protection film resembling a sheet is wrapped around the electricity-generating element.

Effects of the Invention

The present invention eliminates the necessity, as in the prior art, to fold the insulating member complexly and encase the electricity-generating element, facilitates electrical insulation from the battery container and protection of the electricity-generating element, and improves productivity. Other subjects, constituent elements, and advantageous effects will be made apparent in the following description of an embodiment.

MODES FOR CARRYING OUT THE INVENTION

An embodiment of the present invention will be next described.

Figure 1:
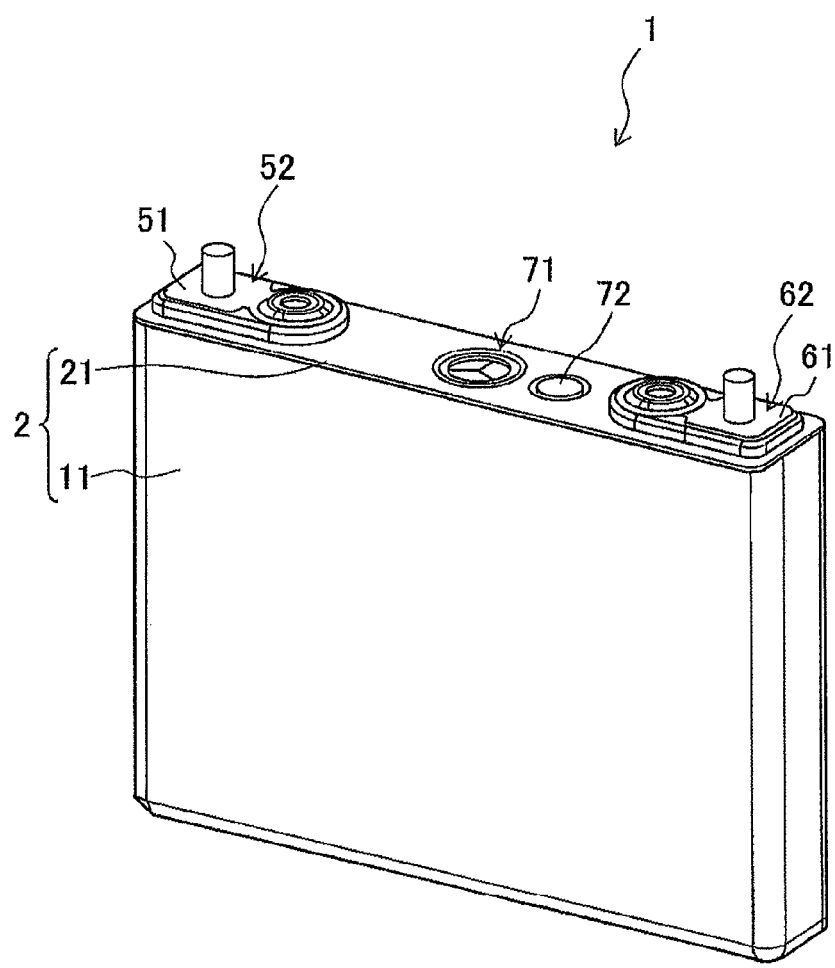
FIG. 1 is an external perspective view of a lithium-ion secondary battery according to an embodiment.
Figure 2:
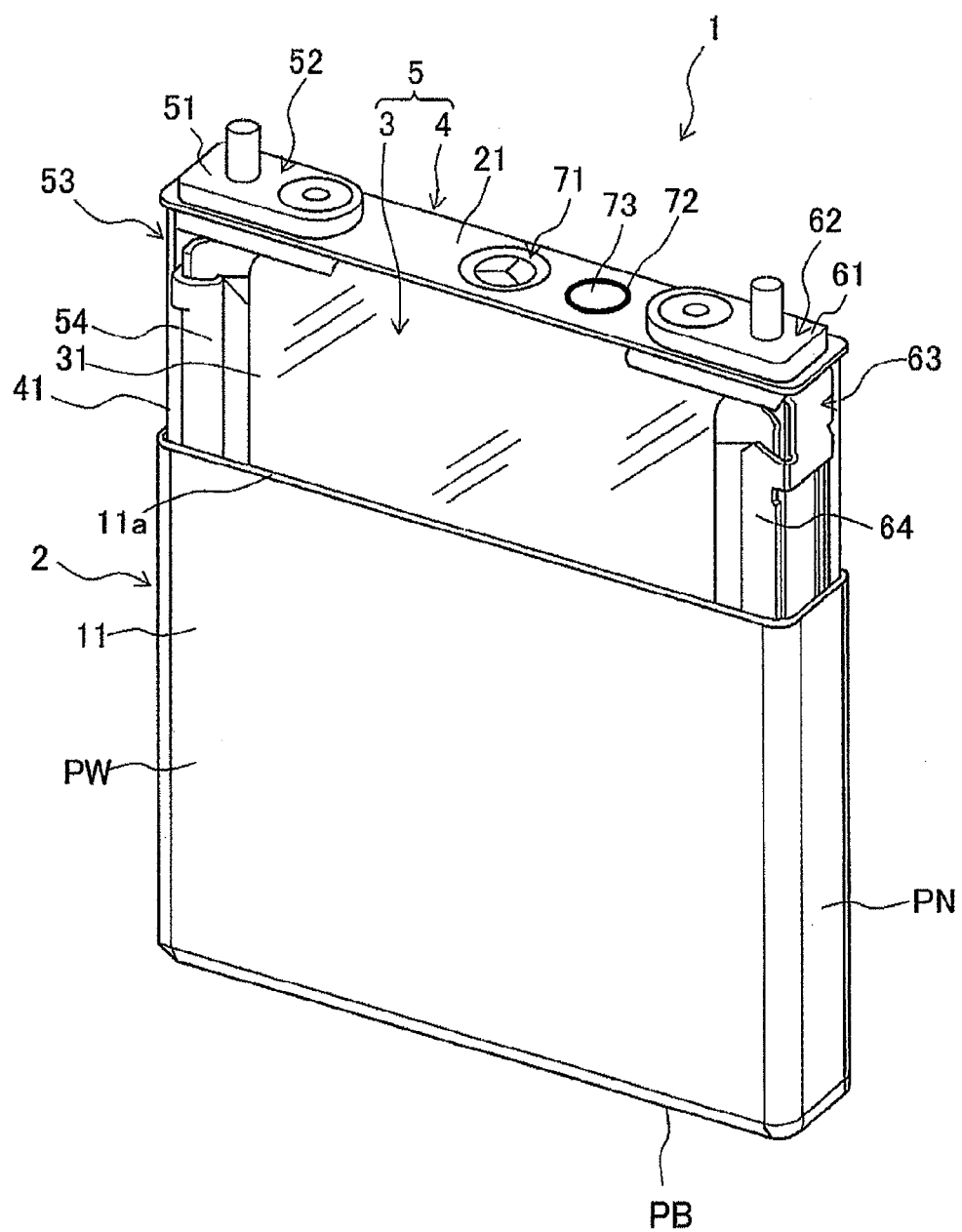
FIG. 2 is a partially cut-away perspective view of the lithium-ion secondary battery shown in FIG. 1.

FIG. 1 is an external perspective view of a lithium-ion secondary battery according to the present embodiment, and FIG. 2 is a partially cut-away perspective view of the lithium-ion secondary battery shown in FIG. 1.

The lithium-ion secondary battery 1 is of construction with an electricity-generating element 3 accommodated in a battery container 2, as shown in FIGS. 1 and 2. The battery container 2 includes a battery casing 11 having an opening 11a, and a battery cover 21 sealing off the opening 11a of the battery casing 11. The electricity-generating element 3 has a wound electrode structure 31 formed by stacking a positive electrode plate and a negative electrode plate, one upon the other, with a separator interposed therebetween in two places, and then winding the three elements together into a flat shape. The wound electrode structure 31 is accommodated in the battery container 2, with an insulating protection film 41 wrapped in sheet-like form around the electrode structure 31.

The battery casing 11 and the battery cover 21 are both fabricated from an aluminum alloy, and the battery cover 21 is laser-welded onto the battery casing 11. The battery container 2 is a flat, rectangular container of a regularly parallelepipedic shape with one pair of wide sidefaces PW, one pair of narrow sidefaces PN, a base PB, and the battery cover 21. On the battery cover 21, a positive electrode terminal 51 and a negative electrode terminal 61 are arranged as a pair of electrode terminals via an electrical insulating member, to form a cover assembly 4. In addition to the positive electrode terminal 51 and the negative electrode terminal 61, a gas release valve 71 that will be opened to release an internal gas from the battery container 2 when an internal pressure of the battery container 2 increases above a predetermined value, and a filling port 72 for filling the battery container 2 with an electrolyte are also provided on the battery cover 21.

The positive electrode terminal 51 and the negative electrode terminal 61 are arranged at positions distant from each other, one on one lateral side of the battery cover 21 and the other on the other lateral side thereof. The positive electrode terminal 51 includes an outside terminal 52 disposed outside the battery cover 21, and a connection terminal 53 disposed inside the battery cover 21 and connected to the outside terminal 52 to establish electrical continuity. Similarly, the negative electrode terminal 61 includes an outside terminal 62 disposed outside the battery cover 21, and a connection terminal 63 disposed inside the battery cover 21 and connected to the outside terminal 62 to establish electrical continuity. The outside terminal 52 and connection terminal 53 at the positive electrode side are fabricated from an aluminum alloy, and the outside terminal 62 and connection terminal 63 at the negative electrode side are fabricated from a copper alloy.

The connection terminals 53, 63 and the outside terminals 52, 62 are each electrically insulated from the battery cover 21 by the insulating member (not shown) that intervenes between the terminal section and the battery cover 21. The connection terminals 53, 63 each include a current-collecting terminal 54, 64 extending from the inside of the battery cover 21, towards a base of the battery casing 11, and connected to the wound electrode structure 31 to establish electrical continuity. The wound electrode structure 31 is disposed and supported between the current-collecting terminal 54 of the positive electrode terminal 51 and the current-collecting terminal 64 of the negative electrode terminal 61, and an electricity-generating element assembly 5 is constituted by the cover assembly 4 and the wound electrode structure 31.

Figure 3:
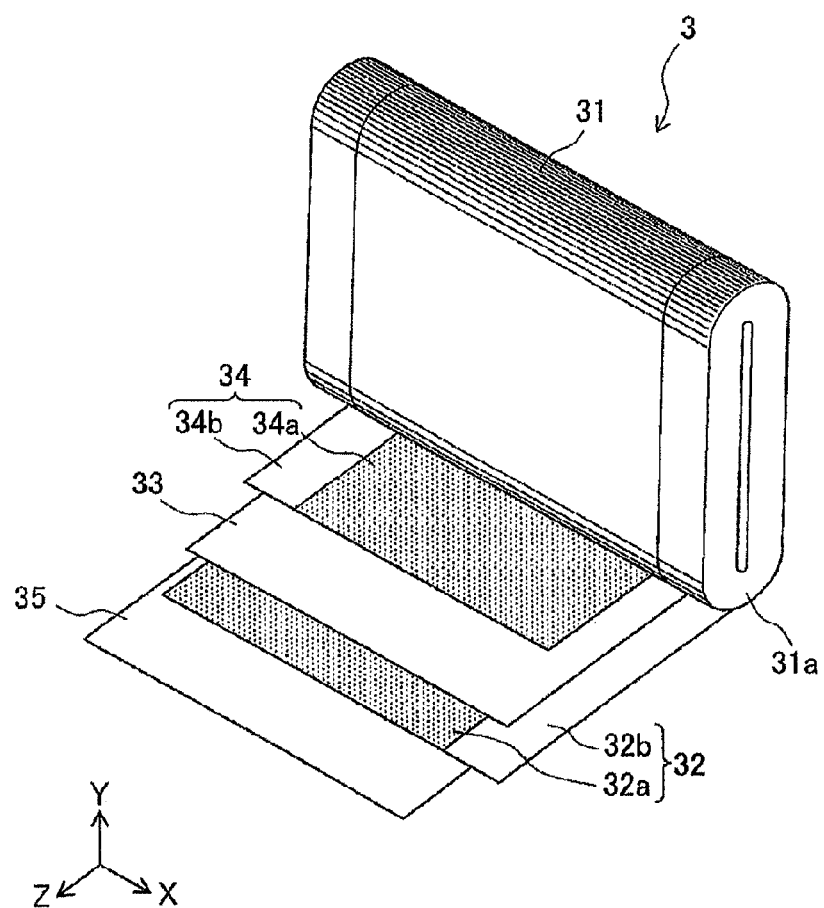
FIG. 3 is a detailed external perspective view of a wound electrode structure in FIG. 2, showing the wound electrode structure in a partially developed state.

FIG. 3 is a detailed external perspective view of the wound electrode structure shown in FIG. 2, and shows the wound electrode structure in a partially developed state.

The wound electrode structure 31 is constructed by stacking the negative electrode plate 32, the separator 33, the positive electrode plate 34, and the separator 35, in that order, and then winding these elements together into a flat form. As shown in FIG. 3, the electrode plate located at the outermost peripheral position in a lateral direction of the wound electrode structure 31 is the negative electrode plate 32 and the separator 35 is further wound around this electrode plate.

The separators 33, 35 have a function that provides electrical insulation between the positive electrode plate 34 and the negative electrode plate 32. The wound electrode structure 31 is constructed so that the negative electrode plate 32 has a coated negative electrode section 32a larger than a coated positive electrode section 34a of the positive electrode plate 34, in a cross direction of the wound electrode structure 31, and thus so that when folded, the coated positive electrode section 34a is always shrouded by the coated negative electrode section 32a.

After being wound, a non-coated positive electrode section 34b and a non-coated negative electrode section 32b are bundled on a planar section and connected (by welding, for example) to the positive- and negative-electrode current-collecting terminals 54 and 64 leading to the outside terminals 52 and 62. The separators 33, 35 are wider than the coated negative electrode section 32a in the cross direction. However, even if the electrode sections 34, 32b are welded in bundles, the separators do not inconvenience the welding of the electrode sections since the electrode structure 31 is wound at where respective metal foil surfaces of the non-coated positive electrode section 34b and non-coated negative electrode section 32b become exposed.

The positive electrode plate 34 includes the coated positive electrode section 34a that is a section coated with a positive-electrode active material mixture on both sides of a positive-electrode current collector, and the non-coated positive electrode section (exposed foil section) 34b not coated with a positive-electrode active material mixture is provided at one lateral end of the positive electrode foil.

The negative electrode plate 32 includes the coated negative electrode section 32a that is a section coated with a negative-electrode active material mixture on both sides of a negative-electrode current collector, and the non-coated negative electrode section (exposed foil section) 32b not coated with a negative-electrode active material mixture is provided at the other lateral end of the positive electrode foil. The non-coated positive electrode section 34b and the non-coated negative electrode section 32b are regions having the exposed metal surfaces of the electrode foils, and the electrode structure 31 is wound so that as shown in FIG. 3, one of these non-coated electrode sections is disposed at one side in an axial direction of winding, and the other at the other side in the axial direction of winding.

The negative electrode plate 32 uses the negative-electrode mixture prepared by adding 10 parts by weight of polyvinylidene fluoride (hereinafter, referred to as PVDF) as a binding agent, in 100 parts by weight of an amorphous carbon powder as a negative-electrode active material, then further adding N-methylpyrrolidone (hereinafter, referred to as NMP) as a dispersion solvent to the two chemical substances, and kneading a thus-obtained solution. Both surfaces of a 10 μm thick copper foil (negative electrode foil), except for the current-collecting section (non-coated negative electrode section), are coated with the negative-electrode active material. This coating operation is followed by drying, press-working, and cutting, in that order, to obtain the negative electrode plate having a 70 μm thick section coated with the negative-electrode active material, this coated section not including the copper foil.

In the present embodiment, using amorphous carbon as the negative-electrode active material, has been described by way of example. The kind of negative-electrode active material, however, is not limited to amorphous carbon and can be either natural graphite into/from which lithium ions can be inserted/desorbed, any one of various artificial graphite materials, coke, or any other carbonaceous material. In addition, the negative-electrode active material may have a scale-like, globular, fibrous, clumpy, or any other equivalent particle shape; the particles of the active material are not limited to these shapes.

The positive electrode plate 34 uses the positive-electrode mixture prepared by adding 10 parts by weight of scale-like graphite as an electrically conductive material, and 10 parts by weight of PVDF as a binding agent, in 100 parts by weight of lithium manganate (chemical formula: $LiMn_2O_4$) as a positive-electrode active material, then further adding NMP as a dispersion solvent to the three chemical substances, and kneading a thus-obtained solution. Both surfaces of a 20 μm thick aluminum foil (positive electrode foil), except for the non-coated current-collecting section (non-coated positive electrode section), are coated with the positive-electrode active material. This coating operation is followed by drying, press-working, and cutting, in that order, to obtain the positive electrode plate having a 90 μm thick section coated with the positive-electrode active material, this coated section not including the aluminum foil.

In the present embodiment, using lithium manganate as the positive-electrode active material, has been described by way of example. Lithium manganate may however be replaced by, for example, either of any other appropriate lithium-manganese oxide having a spinel crystal structure, a lithium-manganese composite oxide partially substituted by or doped with a metal element, lithium cobalt oxide or lithium titanate having a layered crystal structure, or a lithium-metal composite oxide obtained by substituting a part of these oxides by, or doping a part thereof with, a metal element.

In addition, while using PVDF as the binding agent for the coated sections of the positive electrode plate and the negative electrode plate has been described by way of example in the present embodiment, PVDF may be replaced by, for example, either of polytetrafluoroethylene (PTFE), polyethylene, polystyrene, polybutadiene, butyl rubber, nitrile rubber, styrene-butadiene rubber, polysulfide rubber, nitrocellulose, cyanoethylcellulose, various kinds of latex, acrylonitrile, vinyl fluoride, vinylidene fluoride, propylene fluoride, chloroprene fluoride, such a polymer as of an acrylic resin, and a mixture of these plastics and resins.

Figure 6:
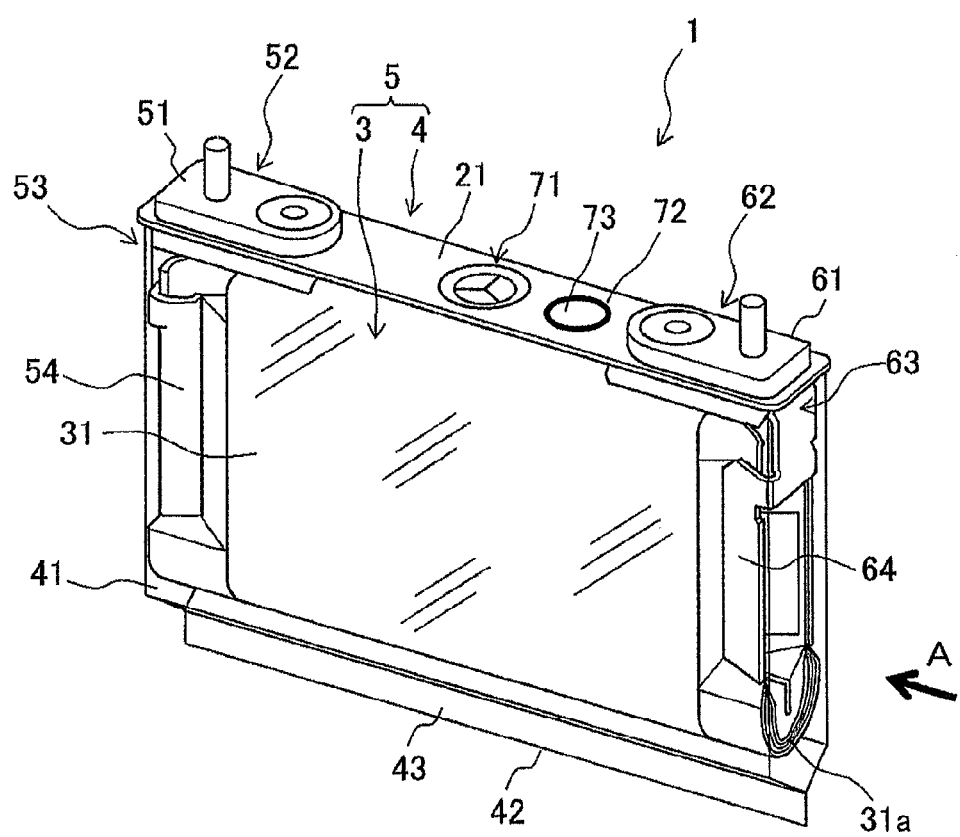
FIG. 6 is an explanatory diagram illustrating an example of a method for closing a protruding end portion of the insulating protection film.
Figure 8:
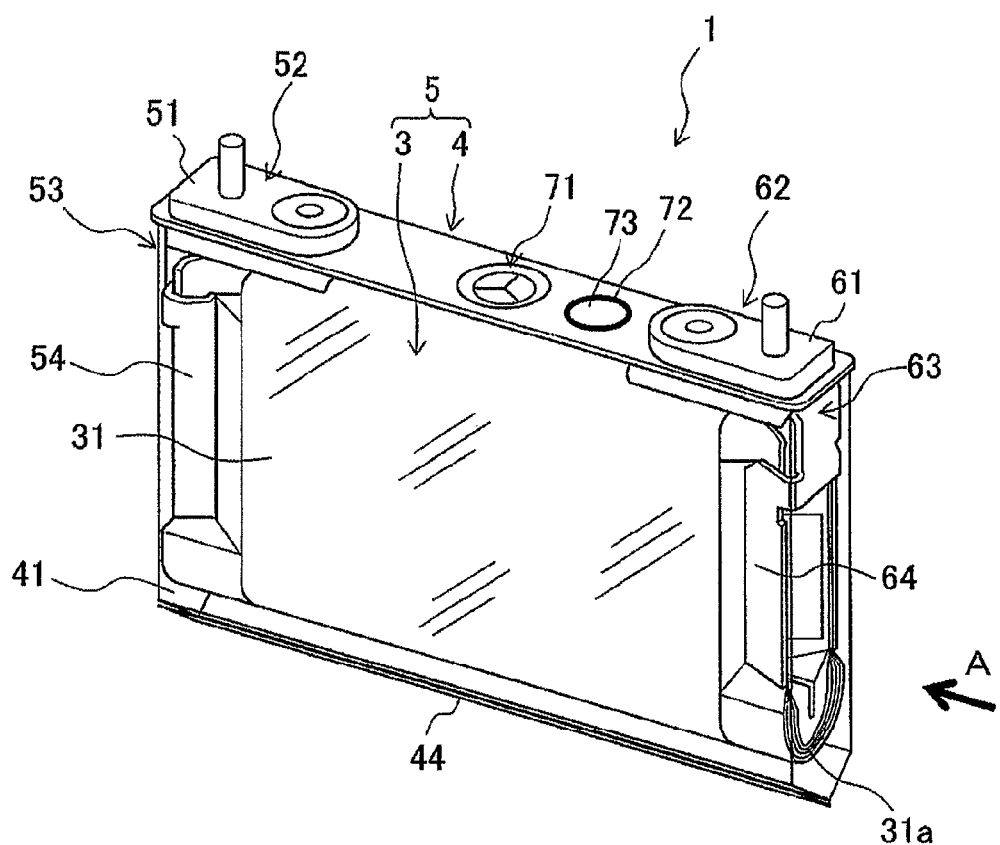
FIG. 8 is an explanatory diagram illustrating an example of another method for closing the protruding end portion of the insulating protection film.

Next, composition of the insulating protection film 41 wrapped around the wound electrode structure 31 is described below. While as shown in FIGS. 2, 6, 8, the insulating protection film 41 is shown as a transparent member for descriptive convenience sake, this film does not always need to be transparent and may be an opaque one.

As discussed earlier herein, conventional lithium-ion secondary batteries have the problem of lacking productivity. This is due to the difficulty with the automation of their partial forming processes, since there is a need to fold an insulating sheet complexly into a box-like shape, accommodate a wound electrode structure in the box-like sheet, and insert this sheet into a battery casing with care so as not to allow the sheet to shift in position.

In contrast to this, the lithium-ion secondary battery 1 in the present embodiment, as shown in FIG. 2, includes the sheet-like insulating protection film 41 wrapped around the wound electrode structure 31 of the electricity-generating element assembly 5, with an outer periphery of the wound electrode structure 31 and the connection terminals 53, 63 being shrouded together through at least one continuous turn of the film.

The insulating protection film 41 can be mounted by wrapping it around the wound electrode structure 31, and in addition, mounting can be accomplished with the film 41 prevented from shifting in position relative to the electrode structure 31. Compared with the films used in the conventional batteries, therefore, the insulating protection film 41 is easy to mount, and thus, easy to insert into the battery casing of the wound electrode structure 31.

Figure 4:
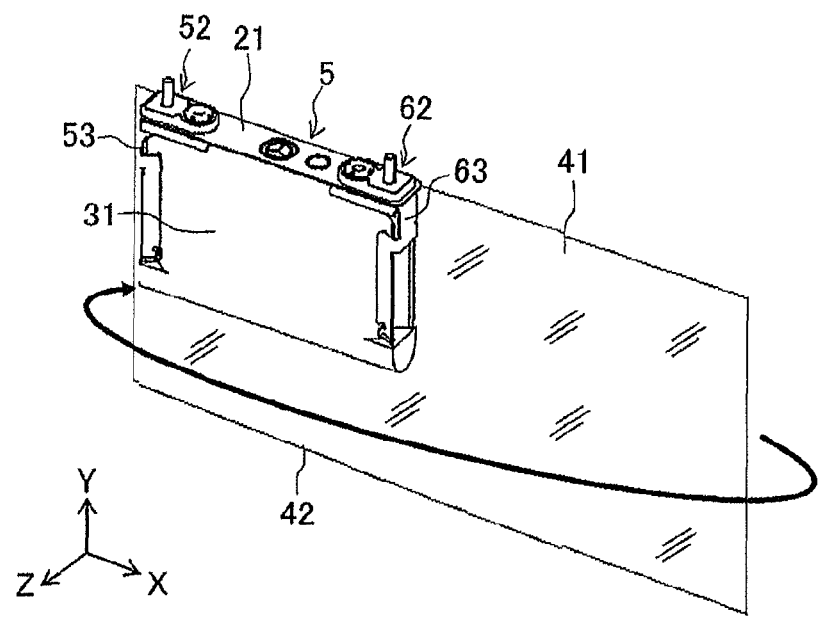
FIG. 4 is an explanatory diagram illustrating a method of wrapping an insulating protection film.
Figure 4:
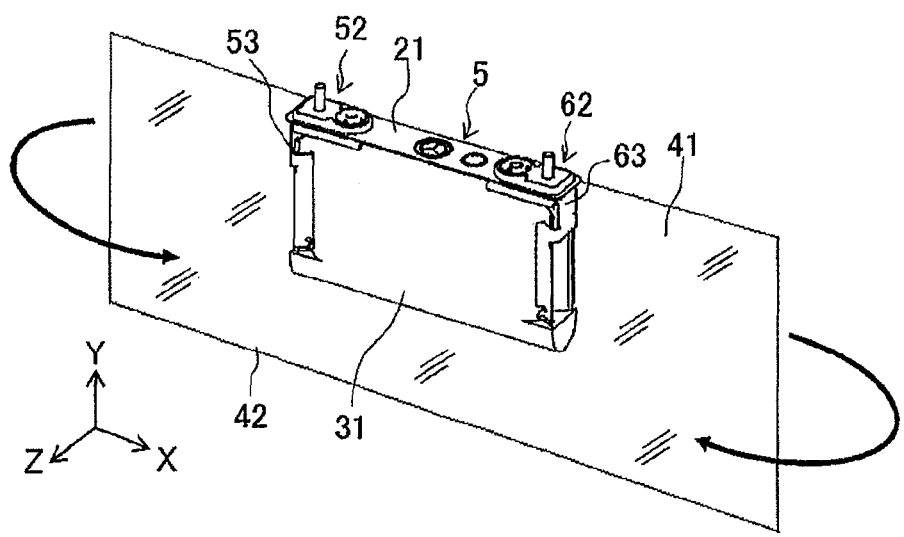

The insulating protection film 41 is composed of one sheet of synthetic resin material such as polypropylene (PP), and is long enough to be wrapped around the wound electrode structure 31 through at least one turn of the film with a wrapping center placed in a direction parallel to a wide surface of the electrode structure 31, and in a direction orthogonal to; an axial direction of winding of the electrode structure (i.e., a Y-axis direction in FIG. 4). The insulating protection film 41 is also wide enough to ensure that after wrapping, one lateral end (protruding end portion 42) of the film as disposed in a base direction of the battery casing 11 protrudes downward in a tubular form below a level of the wound electrode structure 31, towards the base of the battery casing 11.

In the present embodiment, the insulating protection film 41 is set to have the length including an overlapping allowance through which, after the film 41 has been wrapped around the wide surface of the wound electrode structure 31 through one turn to shroud the electrode structure 31 together with the connection terminals 53, 63, both ends of the film 41 are overlapped upon each other for fixing. The insulating protection film 41 is also set to have the width including a thermal deposition (fusion, welding, or equivalent) allowance or bending allowance so that both ends of the film 41 can be sealed off in a state of further downward protrusion below a curved portion 31a of the wound electrode structure 31 that is disposed near the base of the battery casing 11.

Thickness of the insulating protection film is preferably between 0.01 mm and 0.50 mm inclusive, and further preferably between 0.03 mm and 0.20 mm. If the battery has a sufficient internal space volume, however, the thickness of the insulating protection film 41 is not limited to these data ranges. For example, these data ranges may not apply if the insulating protection film 41 is thick enough to intervene between the electricity-generating element assembly 5 and the battery container 2 and to maintain insulation and protect the electricity-generating element.

While using PP as the material of the insulating protection film 41 has been described by way of example in the present embodiment, the material of the insulating protection film 41 is not limited to PP and can be any other synthetic resin material that is not reacted upon, altered, or affected by the battery electrolyte, such as tetrafluoroethylene-perfluoroalkylvinylether copolymer (PFA), polyphenylene sulfide (PPS), or polyethylene terephthalate (PET). In addition, the length of the insulating protection film 41 is not limited to the values described by way of example above, and needs only to be at least one turn of length. For example, the length of the film may be such that it can be wrapped through two turns or more.

The insulating protection film 41 is wrapped so that one lateral end portion of the film is disposed at a position proximate to a side of the battery cover 21 to such an extent that the particular end portion does not overlap the side of the cover 21. In the present embodiment, the insulating protection film 41 is wrapped so as to form a clearance of about 0.5 mm between an upper end portion of the insulating protection film and the battery cover 21.

After the insulating protection film 41 has shrouded the outer periphery of the wide surface of the wound electrode structure 31 together with the connection terminals 53, 63, the end portions of the film 41 that overlap each other are fixed with a pressure-sensitive adhesive tape (not shown). Instead of pressure-sensitive adhesive taping, fastening with an adhesive may be used to fix the overlaps. Another alternative would be by using a sheet-like sticky film coated on one surface of the film with a pressure-sensitive adhesive which is not reacted upon, altered, or affected by the battery electrolyte, or by using a wrapping film that will provide secure fixing of its surfaces when wrapped. The latter two methods allow easier fixing of the film surfaces than using a pressure-sensitive adhesive tape or an adhesive.

An example of a recommended method for wrapping the insulating protection film 41 is shown in FIG. 4(a). This method is by bringing a portion of the wound electrode structure 31 or connection terminals 53, 63 into firm contact with an end portion of the insulating protection film 41 and then wrapping the film from one direction under tension for shrouding. Another example of a recommended wrapping method is shown in FIG. 4(b). This method is by bringing the wound electrode structure 31 of the electricity-generating element assembly 5 into firm contact with a longitudinal intermediate section of the insulating protection film 41 and then moving longitudinal ends of the film for shrouding in a direction that the ends approach each other to wrap the wound electrode structure 31 from both sides of the axial direction of electrode structure 31.

Figure 5:
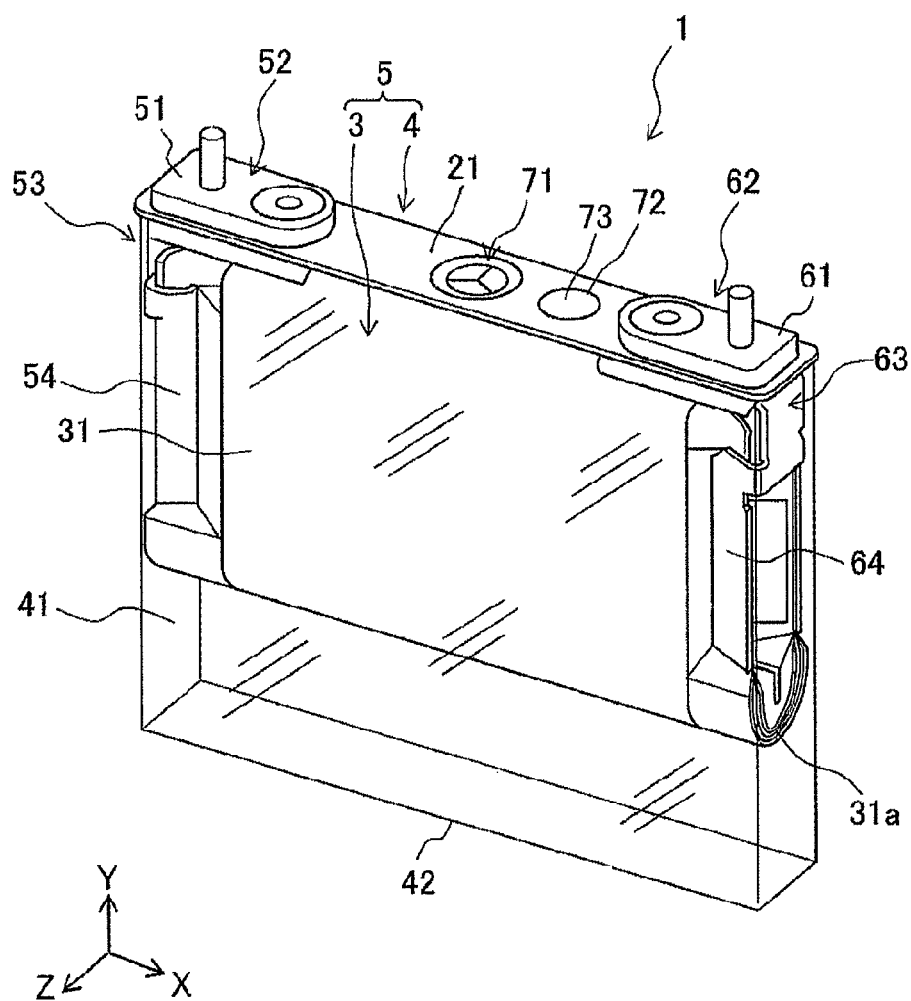
FIG. 5 is a perspective view showing the insulating protection film as placed in wrapped form.
Figure 7:
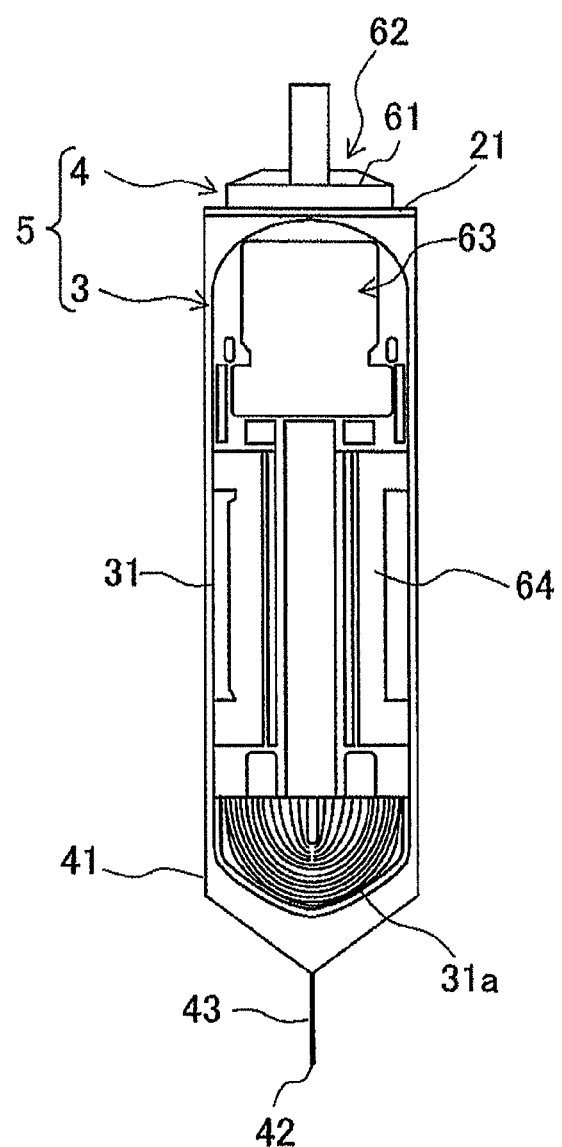
FIG. 7 is an external view of an electricity-generating element assembly as viewed from a direction of arrow A in FIG. 6.

FIG. 5 is a perspective view showing the insulating protection film as it is wrapped, FIG. 6 is an explanatory diagram illustrating an example of a method for closing an end portion of the insulating protection film, and FIG. 7 is an external view of the electricity-generating element assembly as it is viewed from a direction of arrow A in FIG. 6.

As shown in FIG. 5, the insulating protection film 41 is opened at its end portion 42 that protrudes further downward in a tubular form below a level of the curved portion 31a of the wound electrode structure 31 that is disposed near the base of the battery casing 11. The open protruding end portion 42 is sealed off from both sides by thermal deposition, thus causing both surfaces of the end portion to mate with each other to form a closed end. This state is shown in FIGS. 6 and 7. As a result, the insulating protection film 41 has a bag-like shape to shroud the curved portion 31a of the wound electrode structure 31 in such a form as to enfold the electrode structure 31 from both sides. The thermal deposit 43 of the insulating protection film 41 is formed by, after insertion into a thermal deposition machine not shown, heating with the machine and deposition in a length direction of the protruding end portion 42.

Figure 9:
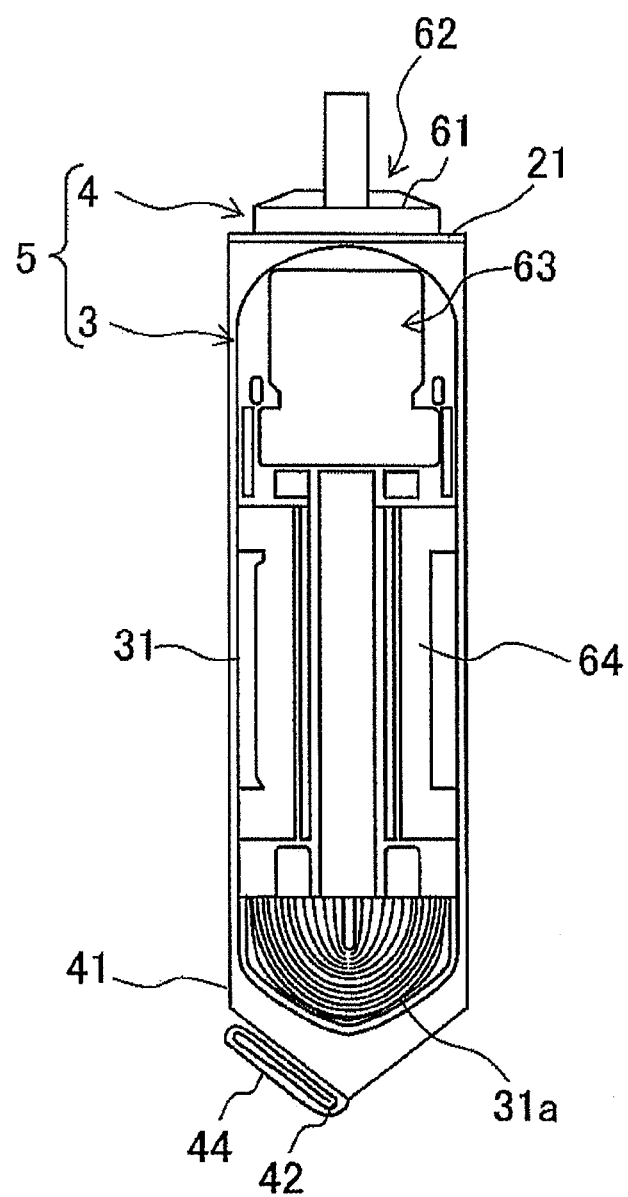
FIG. 9 is an external view of the electricity-generating element assembly as viewed from a direction of arrow A in FIG. 8.

The method of thermal deposition has been described as an example of a method for sealing off the protruding end portion 42 of the insulating protection film 41, but the sealing method is not limited to the example involved. For example, as shown in FIGS. 8 and 9, sealing may be done in the following fashion. That is to say, the tubularly protruding open end 42 may be closed by bringing the opposed portions thereof into mutual surface contact, then folding these opposed portions from a lowermost edge to form a fold-over, and sealing off the end 42 at the fold-over 44. Another useable alternative to the above sealing method is by conducting thermal deposition prior to folding, for example, by taping. In addition, while thermal deposition in the length direction of the protruding end portion 42 has been described as an example in the present embodiment, part of the protruding end portion 42 may be partially deposited for sealing.

A method of manufacturing the lithium-ion secondary battery 1 having above mentioned configuration is next described.

First, the positive electrode plate 34, the negative electrode plate 32, and the separators 33, 35 are overlapped at alternate positions with one of the separators 33, 35 interposed between the positive and negative electrode plates 34, 32, and with the other separator 33, 35 placed under the negative electrode plate 32. Under this state, the positive electrode plate 34, the negative electrode plate 32, and the separators 33, 35 are wound into a flat form, whereby the wound electrode structure 31 that is the electricity-generating element 3 is fabricated. Next, the positive electrode terminal 51 and the negative electrode terminal 61 are mounted on the battery cover 21 via an electrical insulating member, whereby the cover assembly 4 is fabricated. After this, the non-coated positive electrode section 34b and non-coated negative electrode section 32b of the wound electrode structure 31 are connected to the positive electrode terminal 51 and negative electrode terminal 61; respectively, on the cover assembly 4, by supersonic bonding to obtain electrical continuity between the electrode sections. Thus the electricity-generating element assembly 5 is fabricated.

After this, the insulating protection film 41 is wrapped around the wound electrode structure 31 of the electricity-generating element assembly 5 so as to shroud the connection terminals 53, 63 together with the electrode structure 31, and the end portion of the film 41 is appropriately fastened using a pressure-sensitive adhesive tape to prevent the film from loosening (see FIGS. 4 and 5). Next, the protruding end portion 42 of the insulating protection film 41 is sealed off by thermal deposition to form the film into a bag-shaped element including the wound electrode structure 31 in it (see FIGS. 6 and 7). The wound electrode structure 31 within the insulating protection film 41 is next inserted from the opening 11a of the battery casing 11 into this casing, and under this state, the battery cover 21 and the battery casing 11 are welded together using a laser. After laser welding, the battery container 2 is filled with the electrolyte from the filling port 72 on the battery cover 21, and then the filling port 72 is blocked with a filler plug 73.

The electrolyte contains 1 mol/liter of lithium hexafluorophosphate (LiPF$_6$) dissolved in a solution formed by mixing ethylene carbonate (EC), dimethyl carbonate (DMC), and diethyl carbonate (DEC) at a volume ratio of 1:1:1.

While an example that contains LiPF$_6$ has been shown as the electrolyte, this electrolyte is not limited to the example and can be, for example, either LiClO$_4$, LiAsF$_6$, LiBF$_4$, LiB(C$_6$H$_5$)$_4$, CH$_3$SO$_3$L$_1$, CF$_3$SOLi, or a mixture of these substances. Additionally, although an example containing a solvent mixture of EC and DMC has been shown as a solvent in the non-aqueous electrolyte, the solvent mixture may include at least one kind of solvent, such as propylene carbonate, ethylene carbonate, dimethyl carbonate, diethyl carbonate, 1,2-dimethoxyethane, 1,2-diethoxyethane, gamma-butyrolactone, tetrahydrofuran, 1,3-dioxolane, 4-methyl-1,3-dioxolane, diethyl ether, sulfolane, methylsulfolane, acetonitrile, propionitrile or propiononitrile. Furthermore, the mixing ratio is not limited to the above example.

Electric power is supplied from the wound electrode structure 31 to an external load via the outside terminals 52, 62, or the wound electrode structure 31 is charged with externally generated electric power via the outside terminals 52, 62.

In the lithium-ion secondary battery of the present embodiment, the insulating protection film 41 of a sheet form is wrapped around the wound electrode structure 31 of the electricity-generating element assembly 5, with the outer periphery of the wound electrode structure 31 and the connection terminals 53, 63 being shrouded together through at least one continuous turn of the film.

The insulating protection film 41, interposed between the battery casing 11 and the region formed from the wound electrode structure 31 and the connection terminals 53, 63, provides electrical insulation between the battery casing 11 and the region formed from the wound electrode structure 31 and the connection terminals 53, 63. The insulating protection film 41 also protects the wound electrode structure 31 and the connection terminals 53, 63.

The insulating protection film 41 can be mounted by wrapping it around the wound electrode structure 31, and in addition, mounting can be accomplished with the film 41 prevented from shifting in position relative to the electrode structure 31. For these reasons, the conventional process steps of folding or bending an insulating sheet into a bag-like form complexly, including in the bag-like sheet a wound group integrated with a battery cover, and inserting this sheet into a battery casing, can be reduced. Compared with the films used in the conventional batteries, therefore, the insulating protection film 41 is easy to mount, and thus, easy to insert into the battery casing of the wound electrode structure 31. This allows the manufacture of the highly producible lithium-ion secondary battery 1.

In addition, the technique for continuously shrouding the wound electrode structure 31 along with a film or a sheet, and the technique for sealing off the film or the sheet by thermal deposition are commonly used in a variety of applications, including batteries. This enables relatively easy automation of mounting and reduces equipment installation costs. Furthermore, unlike the conventional films or sheets, the insulating protection film 41 does not need to be folded or bent into a complex form, which also leads to reducing costs associated with the insulating sheet.

Moreover, since the insulating protection film 41 in the present embodiment is sealed off by the thermal deposition in the length direction of the protruding end portion 42, when the battery casing 11 is filled with the electrolyte from the filling port 72 of the battery cover 21, the electrolyte can be supplied only to the section included in the insulating protection film 41. This enables active impregnation of the wound electrode structure 31 with the electrolyte, which in turn improves impregnation efficiency. Besides, since the electrolyte is not supplied between the battery casing 11 and the insulating protection film 41, unnecessary consumption of the electrolyte is avoided and costs are further reduced.

The present invention is not limited to the above-described embodiment and may be changed and modified in various forms without departing from the scope of the invention. For example, in the above embodiment, wrapping the insulating protection film around the wound electrode structure of the electricity-generating element assembly while applying tension with the film in close contact with at least a part of either the wound electrode structure or the connection terminals has been described as a form of wrapping. However, the invention is not limited to this wrapping form and at least a part of either the wound electrode structure or the connection terminals may be fastened with a pressure-sensitive adhesive tape before the insulating protection film is wrapped.

DESCRIPTION OF REFERENCE NUMBERS

1 lithium-ion secondary battery
2 battery container
3 electricity-generating element
4 cover assembly
5 electricity-generating element assembly
11 battery casing
21 battery cover
31 wound electrode structure
41 insulating protection film
42 protruding end portion
43 thermal deposit
44 fold-over
51 positive electrode terminal (Electrode terminal)
52, 62 outside terminals
53, 63 connection terminals
54, 64 current-collecting terminals
61 negative electrode terminal (Electrode terminal)

The invention claimed is:

1. A lithium-ion secondary battery, comprising:
an electricity-generating element including a wound electrode structure that is formed by winding electrodes into a flat form, wherein the electrodes are connected to a pair of electrode terminals;
a battery container that includes:
a battery casing having an opening,
a battery cover configured to cover the opening in the battery casing, and
one pair of electrode terminals provided on the battery cover via an electrical insulating member; and
an electrical insulating protection film of a sheet-like form that is wrapped around the wound electrode structure and the pair of electrodes in a direction that is orthogonal to an axial direction of the winding of the wound electrode structure, wherein the electrical insulating protection film includes:
a protruding end portion on a lateral end of the insulating protection film that extends beyond the wound electrode structure towards a bottom of the battery casing and away from the battery cover, wherein the protruding end portion have opposed portions that are joined together into mutual surface contact,
a fold over integral to the protruding end portion that is formed by folding lowermost edges of the opposed portions, and a sealed portion formed by sealing off the lowermost edges of the opposed portions.

2. The lithium-ion secondary battery according to claim 1, wherein:
the insulating protection film is sealed off at the protruding end portion by thermal deposition.

3. The lithium-ion secondary battery according to claim 1, wherein:
the insulating protection film is formed from a sticky film coated with a pressure-sensitive adhesive material on at least one surface of the film.

4. A method for manufacturing a lithium-ion secondary battery
the method for manufacturing comprising:
mounting a pair of electrode terminals on a battery cover of battery container via an insulating member and thereby fabricating a cover assembly;
connecting an electricity-generating element to the pair of electrode terminals on the cover assembly and thereby fabricating an electricity-generating element assembly;
winding, in an axial direction, electrodes of the electricity-generating element into a flat form to form a wound electrode structure;
wrapping an electrical insulating protection film around the electricity-generating element in a direction orthogonal to the axial direction of winding of the wound electrode structure;
forming a protruding end portion on a lateral end of the insulating protection film that extends beyond the wound electrode structure away from cover assembly;
bringing opposed portions of the insulating protection into mutual surface contact;
folding lowermost edges of the opposed portions of the insulation protection film over; and
sealing off the protruding end portion.

5. The lithium-ion secondary battery manufacturing method according to claim 4, wherein the wrapping comprises:
while one end of the insulating protection film is in close contact with the electricity-generating element, another end of the insulating protection film is wrapped around the electricity-generating element.

6. The lithium-ion secondary battery manufacturing method according to claim 4, wherein the wrapping further comprises:
while the insulating protection film is being kept in close contact at an intermediate section thereof with the electricity-generating element, one end of the insulating protection film and another end thereof are wrapped around the electricity-generating element.

* * * * *